Figure 1:
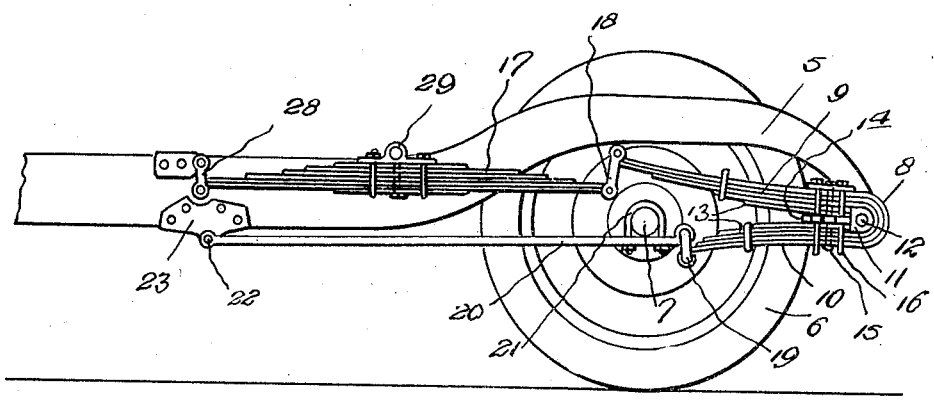

June 30, 1925.

N. YOUNG 1,543,969

CANTILEVER SPRING CONSTRUCTION

Filed Dec. 26, 1923

N. Young,
Inventor

By *Clarence C. O'Brien*
Attorney

Patented June 30, 1925.

1,543,969

UNITED STATES PATENT OFFICE.

NOEL YOUNG, OF NOBLESVILLE, INDIANA.

CANTILEVER-SPRING CONSTRUCTION.

Application filed December 26, 1923. Serial No. 682,723.

*To all whom it may concern:*

Be it known that I, NOEL YOUNG, a citizen of the United States, residing at Noblesville, in the county of Hamilton and State of Indiana, have invented certain new and useful Improvements in Cantilever-Spring Constructions, of which the following is a specification.

This invention relates to certain new and useful improvements in cantilever spring constructions particularly adapted for use upon motor vehicles for effectively absorbing shocks and jars imparted to the vehicle wheels when running over irregularities in the road surface.

The invention is particularly useful for effectively absorbing shocks and jars even though employed upon motor vehicles having a relatively short wheel base, and a specific object of the invention is to provide a spring construction of the above kind which will be extremely simple in construction and durable.

Another object of the invention is to provide a spring construction which may be cheaply and easily manufactured and installed.

With the above general objects in view and others that will become apparent as the nature of the invention is better understood, the same consists in the novel form, combination, and arrangement of parts hereinafter more fully described, shown in the accompanying drawing and claimed.

Figure 2:
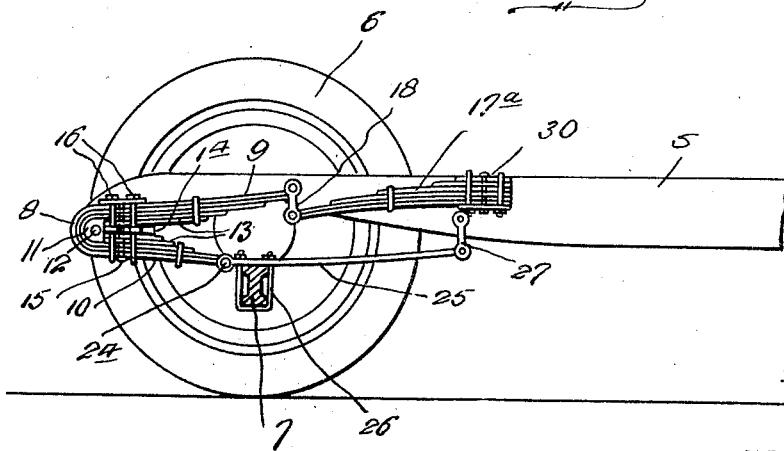

In the drawing wherein like reference characters indicate corresponding parts throughout the two views:

Figure 1 is a side elevational view illustrating the present invention embodied as a suspension means at the rear of a motor vehicle frame, and Figure 2 is a view similar to Figure 1, showing the invention embodied as a spring suspension at the forward end of the vehicle frame, the adjacent supporting wheel of the vehicle being removed for clearly revealing the spring construction.

The chassis frame 5, supporting wheels 6, and axles 7, are of conventional form. The invention embodies a leaf spring 8 disposed longitudinally of the frame 5 and having inwardly extending diverging upper and lower legs 9 and 10 respectively. Secured between the converging ends of the spring legs 9 and 10 is a bearing block or rocking member 11 that is mounted upon a rigid lateral pivot pin 12 carried by the adjacent extreme end of the frame 5, whereby the spring 8 is mounted for vertical rocking movement and the upper leg 9 of the spring 8 is longer than the lower leg 10 thereof so as to extend to a point inwardly of the adjacent axle 7 in a plane above the latter. In other words, the longer leg 9 extends forwardly of the rear axle 7 shown in Figure 1, and rearwardly of the front axle 7 shown in Figure 2, while the shorter leg 10 terminates outwardly of said axle or rearwardly of the rear axle and forwardly of the front axle. The spring 8 is preferably constructed by bending a standard automobile leaf spring around the bearing 11, and the number of leaves in the spring will vary according to the weight and type of the vehicle. Additional separate shorter leaves are then cut and fitted in between the continuous longer leaves of the spring 8, and these separate leaves of the legs 9 are separated from those of the leg 10 by means of a shank 14 rigid with the bearing block 11. A bolt 15 is passed through the legs 9 and 10 and the shank 14 to rigidly secure the leaves and the bearing blocks together to form a rigid unit in every respect except as to the flexibility of the diverging ends of the spring legs 9 and 10. U-bolts 16 also embrace and rigidly secure the parts together at this point.

A second leaf spring 17 or 17$^a$ is mounted upon the frame 5 longitudinally of the latter and has its free outwardly extending end attached to the inner free end of the upper leg 9 of the spring 8 by means of a longitudinally rocking or shackle connection 18 with the outer ends of the springs 17 or 17$^a$ preferably disposed in a lower horizontal plane than the upper legs 9 of the spring 8 as shown in these two views. The inner end of the lower leg 10 of the spring 8 is connected with the axle 7 and in the rear spring suspension shown in Figure 1, this connection may consist of a longitudinally rocking or shackle connection 19 between the inner end of the leg 10 and a rearward extension on the rear end portion of a radius rod 20 that has its rear end portion bolted as at 21 to the rear axle housing and that has its forward end pivoted as at 22 to a bracket 23 secured to the frame 5. In installing the device upon motor vehicles having a longitudinal propeller shaft housing and radius rods connecting the rear axle housing of the frame forwardly of the rear axle, the shackle connection 19 may connect the forward end of the lower leg 10 directly with the rear axle housing or rear axle.

In the spring suspension for the forward end of the vehicle as shown in Figure 2, the rear end of the lower leg 10 is pivoted as at 24 to an extension on the forward end of a longitudinal radius rod 25, that is bolted to the front axle 7 as at 26, and whose rear end is connected with the frame 5 by means of a longitudinally rocking or shackle connection 27.

The spring 17 employed in the rear spring suspension is of the cantilever type with its forward ends attached to the frame 5 by means of a longitudinally rocking or shackle connection 28 and with its intermediate or middle portion pivotally mounted as at 29 upon the frame 5 rearwardly of the connection 28.

The spring 17a employed in the front spring suspension is composed of a plurality of leaves which gradually decrease in length, and this spring has its thicker rear end portion suitably rigidly connected with the frame 5 as at 30, the remaining forwardly projecting portion of said spring 17a being free of connection with the frame 5 as shown.

As the wheel of the car passes over a rise in the road surface, the lower leg 10 is raised with the axle 7, but since the spring 8 is pivoted as at 12 to the frame 5, it is free to rock vertically without raising the frame 5. This motion or rise of the axle 7 is transmitted to the upper leg 9 and then through the connection 18 to the spring 17 or 17a, the adjacent ends of the spring legs 9 and the springs 17 or 17a being free to flex for absorbing the shocks or jar. Where the shock or jar is excessive the lower leg 10 may flex slightly to assist in absorbing the same. The movement of the axle is transmitted through spring members whose combined lengths are comparatively great so that the device will have the effect of lengthening the wheel base of the car, particularly in view of the relationship of the various parts. Also, the end portions of the springs are flexed and not the intermediate portions thereof where less flexibility and shock absorbing qualities are embodied.

From the foregoing description, it is believed that the construction and operation, as well as the advantages of the present invention will be readily understood and appreciated by those skilled in the art.

What I claim as new is:

A vehicle spring structure comprising a rod pivoted at one end to the frame of the vehicle and disposed transversely of the axle bearer, a clip connected with the rod at a point between its ends and passing around the axle, a leaf spring bent upon itself and pivotally connected at the bend with the frame of the vehicle, one end portion of said spring extending toward the rod and connected with the rod at a point at one side of the axle, the other end portion of the spring being disposed transversely of the axle, and a leaf spring pivoted upon the body of the vehicle and having one end pivotally connected with that end portion of the first mentioned spring which is disposed transversely across the axle, and the other end portion of the second mentioned spring being pivotally connected with the frame at a point above the point of pivotal connection of the rod with the frame.

In testimony whereof I affix my signature.

NOEL YOUNG.